May 22, 1956 — J. J. POWERS — 2,746,717
UTILITY TRUCK-BODY
Filed Sept. 10, 1952 — 2 Sheets-Sheet 1
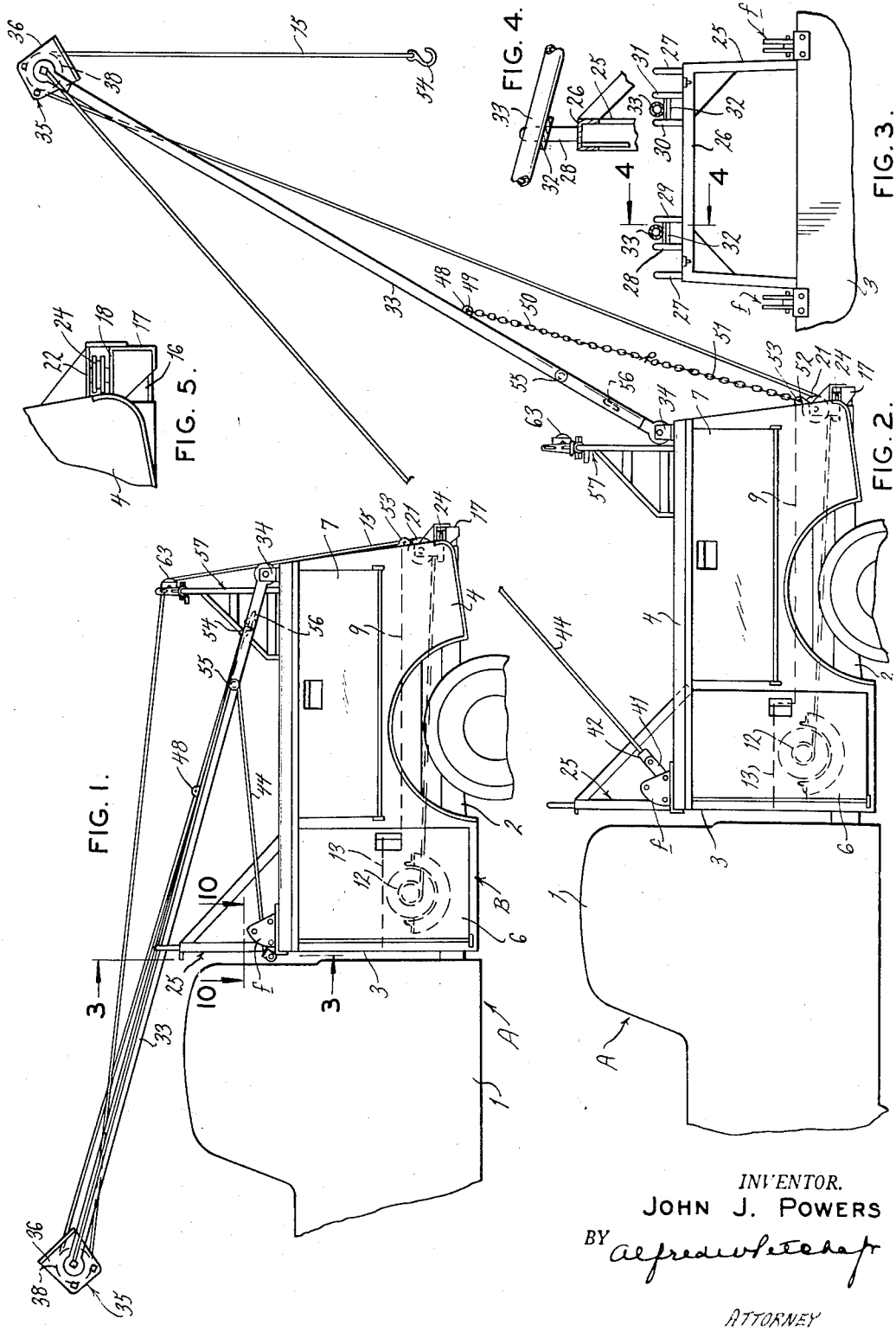
INVENTOR.
JOHN J. POWERS
BY *Alfred W. Fletcher*
ATTORNEY May 22, 1956 J. J. POWERS 2,746,717
UTILITY TRUCK-BODY
Filed Sept. 10, 1952 2 Sheets-Sheet 2
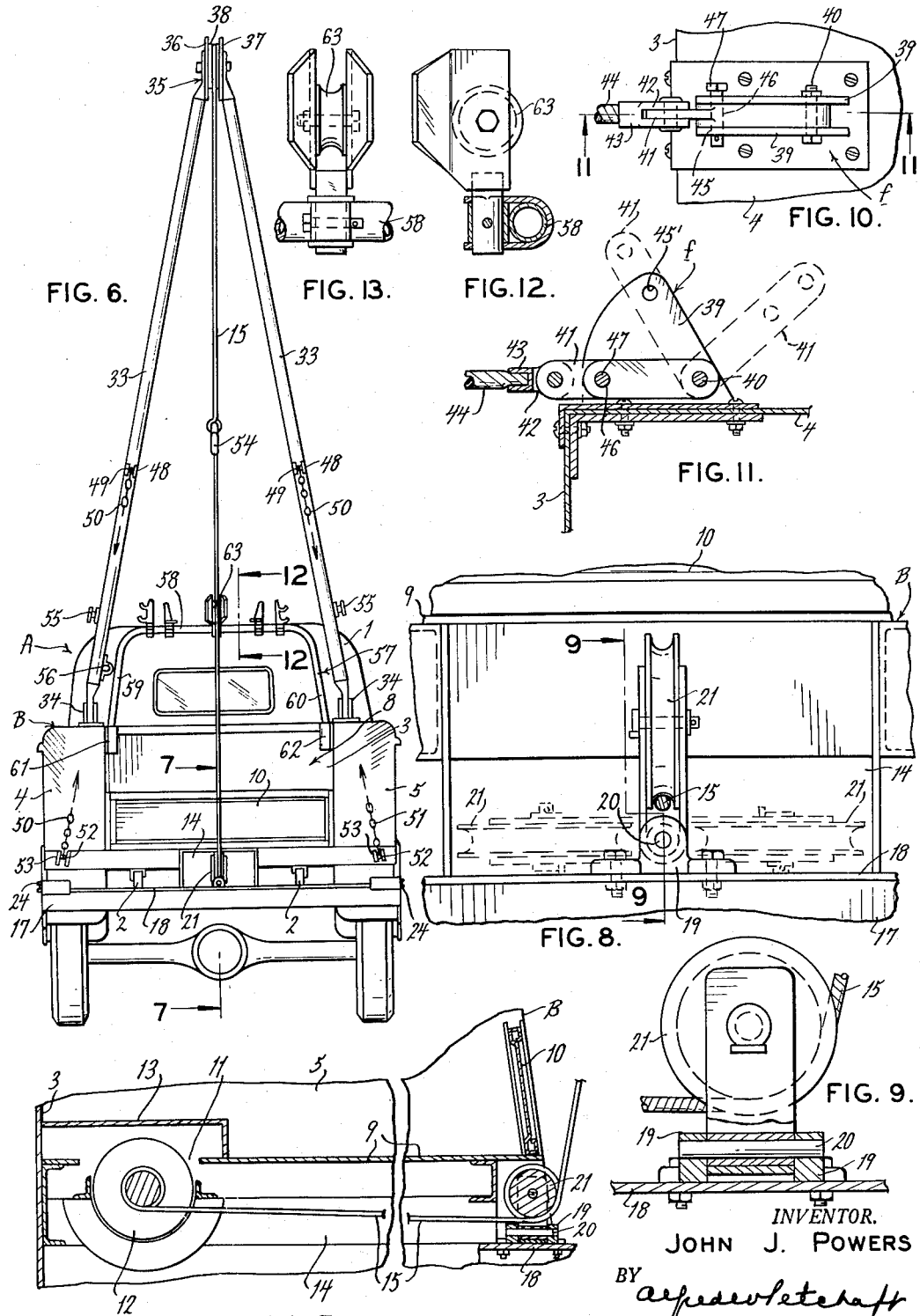
INVENTOR.
JOHN J. POWERS
BY
ATTORNEY

United States Patent Office 2,746,717
Patented May 22, 1956

2,746,717
UTILITY TRUCK-BODY
John J. Powers, St. Louis, Mo.

Application September 10, 1952, Serial No. 308,787

1 Claim. (Cl. 254—139.1)

This invention relates in general to certain new and useful improvements in utility vehicles and, more particularly, to a utility truck-body suitable for general all-purpose field work and outlying and remotely located public utility systems, such as small rural electric distribution companies and the like, and is a continuation-in-part of my pending application Serial No. 257,805 which has now become United States Letters Patent No. 2,636,717, issued April 28, 1953.

In large metropolitan areas, the public utility systems are highly developed and relatively compact, so that various different types of maintenance crews can be constantly employed for a variety of specialized or departmentalized tasks and duties. In such public utility systems, it is not only convenient, but highly expedient, to maintain transformer repair crews, new-line installation crews, household maintenance and repair crews, and many different kinds of special maintenance groups, each group or crew being equipped with its own special type of vehicle or truck, carrying tools and equipment suitable to the particular type of tasks carried out by such crew. This highly complicated maintenance organization is not at all feasible or economical for small utility systems, such as those which are situated throughout the rural areas of the country. Even in large, highly integrated public utility systems there frequently are remotely located areas to which it is not economically desirable to send highly specialized maintenance crews, with the result that it is necessary to maintain a small all-purpose maintenance crew in such area. In order to equip such crews, it is desirable to provide a work-vehicle which is equipped with a derrick and more or less universally adaptable winch, together with necessary tool space and working space on the truck floor, so that the unit will lend itself readily to all types and conditions of maintenance work ordinarily encountered in the field.

It is, therefore, the primary object of the present invention to provide a vehicle having an all-purpose or general utility body uniquely suitable for meeting and handling all types of maintenance jobs ordinarily encountered in the field.

It is another object of the present invention to provide a vehicle body of the type stated which is equipped with a derrick, winch, and other similar equipment suitable for utility maintenance operations.

It is also an object of the present invention to provide a truck-body which is equipped with a simple, and yet sturdy, type of derrick capable of being swung from inoperative position to operative position in a simple, convenient, and speedy manner.

It is an additional object of the present invention to provide a truck-body having a derrick and winch so arranged that the floor of the truck will, at all times, be clear and available as working space and will not subject the workman to the hazard of becoming entangled in the winch cable or in the winch mechanism itself.

It is a further object of the present invention to provide a vehicle body of the type stated which is rugged, durable, and relatively inexpensive, while, at the same time, being readily adaptable to all-purpose utility maintenance work.

With the above and other objects in view, my invention resides in the novel features of form, construction, arrangement, and combination of parts presently described and pointed out in the claim.

In the accompanying drawings

Figure 1 is a fragmentary side elevational view of a derrick truck constructed in accordance with and embodying the present invention, showing the derrick in transport position;

Figure 2 is a fragmentary side elevational view of a derrick truck constructed in accordance with and embodying the present invention, showing the derrick in upright position;

Figure 3 is a fragmentary sectional view taken along line 3—3 of Figure 1;

Figure 4 is a fragmentary sectional view taken along line 4—4 of Figure 3;

Figure 5 is a fragmentary side elevational view of the rear corner of the truck-body, showing in more detail the construction of the winch cable guiding corner-pulleys;

Figure 6 is a rear end elevational view of the truck-body;

Figure 7 is a fragmentary sectional view taken along line 7—7 of Figure 6;

Figure 8 is an enlarged fragmentary rear end elevational view showing the cable guiding central-pulley;

Figure 9 is a fragmentary sectional view taken along lines 9—9 of Figure 8;

Figure 10 is a fragmentary sectional view taken along line 10—10 of Figure 1;

Figure 11 is a fragmentary sectional view taken along line 11—11 of Figure 10;

Figure 12 is a fragmentary sectional view taken along line 12—12 of Figure 6; and Figure 13 is an enlarged end elevational view of the auxiliary-pulley for guiding the cable when the derrick is being moved from transport position to upright position or the reverse.

Referring now in more detail and by reference characters to the drawings, which illustrate a preferred embodiment of the present invention, A generally designates a truck having a cab-and-engine unit 1 conventionally mounted upon a rearwardly extending chassis 2. It will be understood that the cab-and-engine unit 1 and chassis 2 are of any conventional type or design and, therefore, need not be specifically described or discussed herein. Rigidly mounted upon the chassis 2 is a truck-body B comprising a forward vertical transverse end wall 3 and rearwardly extending double-walled compartmentalized side panels 4, 5, each being suitably and conventionally provided in their outwardly presented faces with swingably mounted doors 6, 7, for affording ready access to the compartmentalized interiors of the side panels 4, 5. As will be seen by reference to Figure 2, the side panels 4, 5, extend along the longitudinal margins of the truck-body 2 in spaced parallel relation, thereby providing an intermediate working space 8 having a flat horizontal floor 9. Hinged to, and extending transversely across, the rear margin of the floor 9, between the side panels 4, 5, is a tailgate 10, serving as an end closure for the otherwise open rear end of the truck-body B.

At its forward end, the floor 9 is cut away and provided upon its outer face with an arcuately depending or underslung well 11, sized for accommodating substantially a conventional cable winch 12. Removably secured in cover-forming relation over the well 11, for enclosing and completely concealing and protecting the winch 12, is a rectilinear box-like cover 13. Welded or otherwise suitably secured upon the under face of the floor 9 and extending longitudinally rearwardly along the center-line thereof is a tunnel-like channel 14 opening at its forward end into the well 11 and at its rearward end upon the back end of the truck-body B just below the tailgate 10 for housing and enclosing the rearwardly extending run of a winch cable 15.

The rear end of the chassis 2 is provided with horizontally projecting arms 16 for supporting a transversely extending channel-shaped bumper-bar 17 having an upwardly presented broad flat top face 18, the central portion of which lies directly beneath the rearward opening of the channel 14. Bolted upon the upper face 18 of the bumper-bar 17, directly below the tailgate 10, is an upstanding hinge-journal 19 having a pintle 20 extending therethrough parallel with the longitudinal axis of the truck-body B for swingably supporting a cable-guiding central pulley or sheave 21 which can freely assume any position between the extreme position shown in dotted lines in Figure 8. Similarly mounted on each of the opposite rear corners of the truck-body B, between a plate 22 and the upper plate 18 of the bumper-bar 17, is a horizontally disposed corner-pulley 24 positioned outwardly by a sufficient distance so as to clear the outwardly presented vertical surfaces of the truck-body B, all as best seen in Figure 6. The winch cable 15 may accordingly be trained directly rearwardly upwardly toward the rear at various lateral angles, or angularly to one side or the other, or horizontally crosswise and angularly around either one of the corner-pulleys 24 to be directed toward the front.

It should be stated in this connection that the winch 12 is driven and controlled by a conventional power take-off assembly, operatively connected, through suitable manual controls, to the engine or motor of the truck A. Inasmuch as this driving arrangement is conventional, it has not been illustrated, shown, or described herein.

Welded to, and extending upwardly from, the upper transverse margin of the front wall 3 is an inverted U-shaped support frame 25 having a horizontal cross-bar 26 positioned at a level substantially above the roof of the truck-body A and provided, at suitably spaced intervals, with upwardly extending bracket-forming pins 27, 28, 29, 30, 31, the pins 28, 29, and 30, 31 being respectively cross-connected by angularly deflected plates 32 for receiving tubular derrick-legs 33, which are hingedly mounted at their rearward ends in hinge-fittings 34 welded upon the rearward upper corners of the side panels 4, 5. The derrick-legs 33 extend convergingly toward each other and are rigidly secured together by a top-fitting 35 having spaced parallel sheave-plates 36, 37, for operatively supporting a sheave or pulley 38. When the derrick-legs 33 are not in use, they will extend from the hinge-fitting 34 angularly upwardly and forwardly between the bracket pins 28, 29, and 30, 31, as shown in dotted lines in Figure 1.

Welded, bolted, or otherwise firmly secured upon the upper forward corners of the side panels 4, 5, are guy-retainer fittings f, each comprising a pair of spaced vertical plates 39, the forward margins of which are curved upwardly and rearwardly in the approximate formation of quarter-cycle segments. Swingably mounted in the space between each pair of plates 39 upon a pintle 40 is a link-bar 41 which projects outwardly beyond the plates 39 and is swively connected to an eye 42 having a socketed end 43 for retentively engaging the end of a guy-cable 44 permanently secured, at its opposite end, to the top-fitting 35. The plates 39 are provided with spaced registering pairs of apertures 45, 45', and the link-bar 41 has an aperture 46 which may optionally be aligned therewith to receive a holding-pin 47. As will be seen by reference to Figure 11, the link-bar 41 may assume the three different angular positions. By this means, the overall effective length of the guy-cables 44 may be adjusted so that the rearwardly inclined angular position of the derrick-legs 33 can be adjusted within predetermined limits when disposed in upright or operative position.

The derrick-legs 33 are each provided with a small pair of spaced parallel ears 48 for supporting transverse pins 49, extending through the uppermost link of a guy-chain 50, which extends angularly downwardly, when the derrick-legs 33 are in upright position, for hooked engagement with the upper end of a guy-chain 51, similarly fastened at its lower end to a pin 52 mounted between spaced parallel pairs of ears 53 welded upon the rear end of the truck-body B. Each guy-chain 50 can be connected with its corresponding guy-chain 51 by hooking at any one of several selected links, so that the combined links of the guy-chains 50, 51, can be suitably adjusted for the selected angular position of the derrick-legs 33. It will, furthermore, be noted, by reference to Figures 1 and 2, that when the derrick-legs 33 are in upright position, the winch cable 15 may be trained angularly upwardly over the pulley 38 and swung dependingly therefrom, so that its lower end, which is equipped with a conventional load-hook 54, may be lowered for attachment to any suitable load. Similarly, when the derrick is swung down into inoperative position, the winch cable 15 may, as previously pointed out, be utilized in various angular positions within the horizontal plane, so to speak, for pulling out stumps, or any similar types of work, or may be even swung toward the front and attached to some tree trunk or permanently secured heavy object, such as a bridge abutment or the like, for permitting the truck, through the agency of its winch 12, to pull itself out of the mud or out of a soft roadside embankment whenever necessary.

The derrick-legs 33 may be swung from inoperative to operative position very quickly and may conveniently be set up to various desired angles by a single workman, and, when set up in operative position, will be strongly and rigidly held in such operative position by the link adjustable guy-cable 44 and the correspondingly adjustable sets of guy-chains 50, 51. Furthermore, the winch cable 15 may be used in conjunction with the winch 12 while a workman is standing or working upon the floor 9 of the truck-body B without danger of catching his feet or catching tools and other parts which may be lying upon the floor 9.

The derrick-legs 33 are each provided with outwardly presented spools 55 around which the guy-cables 44 may be hitched when the derrick is in transport position, as shown in Figure 1. The spools 55 are located at a selected distance from the top of the derrick so that the link-bars 41 can be swung to their rearmost positions and the guy-cables 44 will lie loosely bent around their respective spools 55. Then, when the link-bars 41 are swung up and forwardly, the cables 44 will be drawn tight so that they will not flop around during travel of the vehicle.

One of the derrick-legs 33 is also provided on its inwardly presented side, near the hinge-fitting 34, with a hook-retaining eye 56 into which the load-hook 54 may be conveniently inserted just before the derrick is lowered. Thereupon, the guy-chains 50, 51, are released and the slack partially pulled up out of the winch cable 15 by turning the winch 12, leaving just about enough slack to permit the derrick to be pushed up and forwardly past direct-vertical position and start it swinging over an inverted U-shaped bracket 57 having a horizontal bight-portion 58 and diverging legs 59, 60, removably seated in sockets 61, 62, welded upon the interior faces of the side-panels 4, 5, inwardly of the hinge-fittings 34. Operatively mounted centrally of the bight-portion 58 is a sheave 63 into which the winch cable 15 will ride as the derrick-legs 33 fall forwardly toward transport position. Thereupon, by slowly paying out the winch cable 15 from the winch 12, the derrick can be gently lowered under mechanical power to its forwardly cradled transport position. Simply by reversing this operation, the derrick can be raised again to upright position through the power of the winch 12, eliminating an otherwise difficult laborious task for the workmen.

It should be understood that changes and modifications in the form, construction, arrangement, and combination of the several parts of the utility truck-body may be made and substituted for those herein shown and described without departing from the nature and principle of my invention.

Having thus described my invention, what I claim and desire to secure by Letters Patent is:

In a utility truck-body, a floor, a transverse forward end wall and spaced parallel side panels arranged to form a truck-body having a substantially open top and rear end, a hinge-fitting rigidly mounted on each side panel adjacent the rear end and in upwardly spaced relation to the floor, a derrick leg hingedly mounted at one end in each hinge-fitting, said derrick legs converging toward each other and being connected at their other ends in the provision of a two-legged V-shaped derrick frame adapted to swing from inoperative transport position to operative upright position, rack means at the forward end of the truck-body for supporting the derrick in transport position, a relatively long guy-member attached to each derrick leg, pivoted links on the truck-body securely attached to each of said long guy-members for adjusting the effective length thereof when the derrick legs are in upright position, a short guy-member secured to each derrick leg, means for releasably and adjustably engaging the short guy-members in the provision of a two-legged derrick stabilized by four downwardly and outwardly diverging guy-members, a winch mounted on the floor of the truck-body, a pair of vertically spaced pulleys mounted at the rear end of the truck-body, one of said pulleys being located substantially above the level of the hinge-fitting, a cable operatively reeled around the winch and pulleys and attached at one end to the upper end of the derrick, and an outwardly presented member secured to each derrick leg and positioned intermediate the ends thereof so that the guy-members when inoperative may be looped therearound to take up slack.

References Cited in the file of this patent

UNITED STATES PATENTS

| | | |
|---|---|---|
| 814,763 | Anderson | Mar. 13, 1906 |
| 2,180,987 | Larsen et al. | Nov. 21, 1939 |
| 2,336,965 | Shoemaker | Dec. 14, 1943 |
| 2,549,120 | Ormsby | Apr. 17, 1951 |
| 2,630,299 | Troche et al. | Mar. 3, 1953 |
| 2,636,717 | Powers | Apr. 28, 1953 |

FOREIGN PATENTS

| | | |
|---|---|---|
| 748,739 | France | Apr. 25, 1933 |